(12) United States Patent
Chan

(10) Patent No.: US 7,181,738 B2
(45) Date of Patent: Feb. 20, 2007

(54) RUNNING RAMDISK-BASED MICROSOFT WINDOWS 95/98/ME

(76) Inventor: Kam-fu Chan, Flat 2003, Block M, Allway Gardens, On Yat Street, Tsuen Wan (HK)

( * ) Notice: Subject to any disclaimer, the term of this patent is extended or adjusted under 35 U.S.C. 154(b) by 553 days.

(21) Appl. No.: 10/169,311

(22) PCT Filed: Dec. 27, 2000

(86) PCT No.: PCT/IB00/01966

§ 371 (c)(1),
(2), (4) Date: Jul. 3, 2002

(87) PCT Pub. No.: WO01/50215

PCT Pub. Date: Jul. 12, 2001

(65) Prior Publication Data

US 2002/0194394 A1    Dec. 19, 2002

(51) Int. Cl.
*G06F 9/44* (2006.01)
*G06F 9/00* (2006.01)

(52) U.S. Cl. .......................... 717/175; 713/2

(58) Field of Classification Search ........ 717/159–178; 703/23, 27; 710/10, 52; 713/1, 2; 711/104, 711/113, 156, 203; 705/400; 714/6, 36, 714/5, 38; 719/324, 327
See application file for complete search history.

(56) References Cited

U.S. PATENT DOCUMENTS

| 5,063,499 A | 11/1991 | Garber |
| 5,089,958 A | 2/1992 | Horton et al. |
| 5,359,713 A | 10/1994 | Moran et al. |
| 5,459,869 A | 10/1995 | Spilo |
| 5,606,681 A | 2/1997 | Smith et al. |
| 5,842,011 A * | 11/1998 | Basu ........................... 713/2 |
| 6,032,223 A * | 2/2000 | Beelitz ....................... 711/104 |
| 6,052,781 A * | 4/2000 | Weber ........................ 726/22 |
| 6,247,126 B1 * | 6/2001 | Beelitz et al. ................ 713/1 |
| 6,279,109 B1 * | 8/2001 | Brundridge ................... 713/2 |
| 6,317,826 B1 * | 11/2001 | McCall et al. ................ 713/1 |
| 6,411,943 B1 * | 6/2002 | Crawford .................... 705/400 |
| 6,434,696 B1 * | 8/2002 | Kang .......................... 713/2 |

FOREIGN PATENT DOCUMENTS

EP        0358292        3/1990

OTHER PUBLICATIONS

Chunha, Lu et al, "*Function and Configuration of MSDOS.SYS in Windows 95 and DOS*", Inner Mongolia University, vol. 4, 1999, pp. 57-58 (with translation).
T. Remberg et al., Last Aid—Booting Windows From CD-ROM, XP-002201396, 1999.
Microsoft Windows 95: Understanding the Windows 95 Boot Sequence, XP002394886, APr. 1997, The Cobb Group.
Combination Boot Method for Windows 95, XP007123601, Dec. 1998, Research Disclosure Mason Publications, Hampshire, GB.

* cited by examiner

*Primary Examiner*—Kakali Chaki
*Assistant Examiner*—Tuan A. Vu
(74) *Attorney, Agent, or Firm*—Buchanan Ingersoll & Rooney PC

(57) ABSTRACT

A method, resulting in producing a customized running image of files, is provided for running, through customized booting process. Microsoft Windows 95/98/ME on ramdisk in protected WINDOWS mode with additional advantages of either freedom of choice of access to non-volatile rewriteable storage medium or flexibility of preserving user configuration in User Drive(s). The method and the booting process include the steps of producing a customized copy of configuration files used by Microsoft Windows 95/98/ME; copying these configuration files, system files provided by Microsoft for setting up Windows 95/98/ME, other device drivers and programs to storage medium/media to be used in computer system(s) or device(s) capable of running Microsoft Windows 95/98/ME; and with the use of these files from the storage medium/media, booting up in real DOS mode, preparing for and running off Microsoft Windows 95/98/ME on ramdisk in protected WINDOWS mode in the computer system(s) or device(s).

13 Claims, No Drawings

RUNNING RAMDISK-BASED MICROSOFT WINDOWS 95/98/ME

This disclosure is based upon International Application No. PCT/IB00/00010, filed on Jan. 6, 2000, International Application No. PCT/IB00/01671, filed on Nov. 13, 2000, PCT/IB00/01647, filed on Nov. 13, 2000 and International Application No. PCT/IB00/01966 filed Dec. 27, 2000, the contents of which are incorporated herein by reference.

TECHNICAL FIELD

This invention relates to running Microsoft Windows 95/98/Millenium Edition (the operating system) in device(s), including computer system(s), capable of running the operating system. In particular, this invention relates to utilizing ramdisk as a storage medium for the running image of the operating system on which the full operating system can be run off. Access to other non-volatile storage medium is either not required or allowed for preserving user configuration and providing user flexibility for running ramdisk-based Microsoft Windows 95/98/Millenium Edition (Microsoft Windows 95/98/ME) in protected WINDOWS mode.

BACKGROUND ART

For any computer system or device capable of running it, Microsoft Windows 95/98/ME is designed to be installed onto and to run on a non-volatile rewriteable storage medium with sufficient space and speed. Once the protected-mode portion of the operating system runs off on such storage medium, the medium cannot be removed from the computer system or device as the running system need gain access to it. In this sense, the storage medium need to be fixed with the computer system or device when the operating system starts running in protected WINDOWS mode. This description applies to local installation and running of the operating system in standalone computer system(s) or device(s) as well as Server-based Setup and running of the operating system for networked computer system(s) or device(s).

The present invention provides for running the protected-mode Microsoft Windows 95/98/ME on ramdisk in two alternative ways. The first way is called the 'Contained Style', the second the 'Split Style'.

In the Contained Style, the protected-mode Microsoft Windows 95/98/ME can be run wholly on ramdisk without the need for accessing other storage medium. However, it allows non-volatile rewritable storage medium to be used, for instance, for the purposes of saving data derived from work done during using the operating system and of storing user applications. Running the operating system in the Contained Style however cannot suit all purposes and uses.

For instance, the Contained Style cannot provide for easy user flexibility. Preservation of user configuration, for instance, in relation to user application(s) set up on non-volatile rewriteable storage medium during using the operating system requires an additional back-up step before shutting down the operating system and cannot be done automatically. In this way, if such information is not backed up and restored onto the running image of the operating system on ramdisk before it is started into protected WINDOWS mode next time again, modifications to user configuration during a previous session cannot be utilized. Starting up the operating system always in the same way may be suitable or actually required in certain cases and for certain purposes. However, for other cases and purposes, preservation of modifications to user configuration may be a necessity. If such modifications have to be backed up before shutting down every session and restored every time before another session, it will lead to maintenance inconvenience.

Furthermore, for some computer system(s) or device(s), the amount of RAM, Random Access Memory, installed is limited and not sufficient to hold a full installation of the operating system, not to mention other user applications. It is thus essential to separate the core part from other less essential part of the operating system. The core part of the operating system is to be stored in a 'System Drive' on RAM for fast running and the less essential part on a 'User Drive' on non-volatile rewriteable storage medium for access when there is a need. An example is the possibility of separating Internet Explorer (to be stored on User Drive for occasional access or replaced by other similar program of choice) from the system kernel of the operating system (to be stored in a System Drive on ramdisk for fast running). User applications and its configuration can also be stored on such User Drive. The storage of less essential part of the operating system and other user applications together with their configuration on a User Drive and the preservation of their settings from session to session of running the operating system relies on the possibility of preserving such user configuration on a User Drive created on a non-volatile rewriteable storage medium.

The Split Style makes possible the phenomenon of running the operating system on ramdisk and still provides for the preservation of user configuration. This thus allows for the possibility of separating the core part (to be stored in System Drive on ramdisk for fast running) from the less essential part (to be stored on User Drive for occasional access) of the operating system and the setting up of user applications on User Drive(s). The Split Style therefore caters for user flexibility by automatically preserving modifications to user configuration during using the operating system.

In Contained Style, user configuration files and user applications, if any, are stored together with the running image of the operating system on ramdisk. In other words, the System Drive containing the running image of the operating system and the User Drive containing user configuration and user applications are all on ramdisk. At where the System Drive and the User Drive can be either separated into different drives or integrated into one and the same drive.

In Split Style, user configuration files and user applications, if any, are stored on a non-volatile rewriteable storage medium, which can be mapped and used as a drive under real DOS mode before the operating system is started into protected WINDOWS mode. They are separate from the running image of the operating system in System Drive on the ramdisk. In other words, the System Drive containing the running image of the operating system is on ramdisk and the User Drive containing user configuration and user applications is on non-volatile rewriteable storage medium.

To be able to start running Microsoft Windows 95/98/ME on ramdisk either in Contained Style or in Split Style, firstly the operating system has to be booted up under real DOS mode. Secondly, a ramdisk with sufficient size and compatible with Microsoft Windows 95/98/ME has to be set up. Thirdly, the running image of the operating system contained in System Drive has to be transferred to the ramdisk. User Drive (containing suitable configuration files and other applications if any) is placed either on ramdisk again (either integrated with System Drive or separate into another drive on ramdisk) as in the Contained Style or on other non-volatile rewriteable storage medium as in the Split Style. Lastly, Microsoft Windows 95/98/ME is started off in protected WINDOWS mode on the ramdisk by issuing the command, WIN, at the DOS command prompt.

Before this invention, no successful attempts of running Microsoft Windows 95/98/ME on ramdisk in protected WINDOWS mode have been disclosed. The ramdisk driver bundled with the operating system supports only 32 megabytes of maximum size which is not sufficient for storing and running the whole running image of the protected-mode Microsoft Windows 95/98/ME. The ramdisk (version: rhk.rd.1.0) released on 1 Jan. 2000 and copyrighted by Reliable (H. K.) Limited is found to be compatible with Microsoft Windows 95/98/ME and can be configured up to 2 gigabytes which is more than sufficient for the purpose of running the whole operating system on it.

However, the transfer of the running image of the operating system to ramdisk is made difficult by the problems associated with long filenames adopted by the operating system. The commands or programmes provided by Microsoft for copying files cannot cope with long filenames under real DOS mode for this purpose. The documentation of Microsoft—"Unable to Copy Long File Name Files to Large RAMDrive"—makes it plainly that long file name files cannot be copied to ramdisk of over 10 megabytes under Microsoft Windows 98. The document is found at http://support.microsoft.com/support/kb/articles/Q192/9/27.ASP. Microsoft Windows ME, in its official version, even disables the access to real DOS mode. This limitation, however, does not apply to the copying process after the protected-mode Microsoft Windows 95/98/ME is started. However, for the purpose of transferring the running image of the operating system to ramdisk under real DOS mode before starting it in protected WINDOWS mode, there must be a workaround solution.

In this respect, Odi's DOS tools for long file names copyrighted by Ortwin Glueck and released on 7 Dec. 1999 at http://odi.webjump.com/ appear to provide partly the solution of copying long file name files onto large ramdisk. However, this tool set contains known bugs as described in the Readme.txt accompanying the tool set.

There are two significant problems associated with the use of this tool set at present. Firstly, copying all the files comprising the whole running image of Microsoft Windows 95/98/ME using this utility file by file takes long time. Secondly, this tool set at present is only capable of dealing with Unicode characters from code pages 00h and 25h. Many versions of Microsoft Windows 95/98/ME in languages other than code pages 00h and 25h may contain long file names that this tool set cannot cope with. Thus those versions of Microsoft Windows 95/98/ME cannot be run on ramdisk by using this tool set for copying or transferring the running image.

In the case of Microsoft Windows ME, another problem of running it on ramdisk is due to the fact that this particular version of the operating system disables access to real DOS mode during the hard disk boot-up process. This suppression of real DOS mode makes loading real DOS mode drivers through CONFIG.SYS and real DOS mode programmes through AUTOEXEC.BAT or through real DOS command prompt impossible when Microsoft Windows ME boots up from a hard disk. To be able to load real DOS mode drivers or programmes, one has to boot up from the Emergency Boot Disk (prepared by Microsoft Windows ME) placed in the booting floppy drive. This creates great inconvenience. This problem, however, can be solved by writing a software which enables access to real DOS mode during hard disk booting by making patches to IO.SYS, COMMAND.COM in the root directory of the hard disk boot-up drive and REGENV32.EXE in the \WINDOWS\SYSTEM directory. One of such software, Real DOS-Mode Patch for Windows ME v1.3, has been released on the Internet. According to the document accompanying the software, Real DOS-Mode Patch for Windows ME v1.3 was released on 15 Aug. 2000 by a group called MANiFEST DESTiNY with a web-site, which appears, at the time of writing, to be engaging in other business instead of software development.

Given that the above problems are solved, simply copying or transferring the running image prepared by the installation programme of Microsoft Windows 95/98/ME to ramdisk is guaranteed to fail on running if the operating system has not been properly configured for the purpose of running on ramdisk.

This invention makes possible the running of Microsoft Windows 95/98/ME in protected WINDOWS mode on ramdisk after the operating system is booted up in real DOS mode by bootable device. Traditionally, a computer system or device is booted up from a hard disk, floppy disk or boot ROM. Microsoft documents its support of booting from alternate devices by Microsoft Windows 98, for instance, at http://www.microsoft.com/HWDEV/devdes/cdboot.htm. The EL Torito-Bootable CD-ROM Format Boot Specification, Version 1.0, is for booting a computer system from CDROM. Compaq, Intel, Phoenix BIOS Boot Specification, Version 1.01 and ATAPI Removable Media Device BIOS Specification, Version 1.0 are other specifications for booting from various forms of alternate booting devices. At present, these specifications allow booting of Microsoft Windows 95/98/ME into real DOS mode, the running of it in protected WINDOWS mode relies on the presence of a fixed non-volatile storage medium such as a fixed hard disk or a fixed removable disk. These specifications do not specify the setting up and use of ramdisk, the configuration of the running image of Microsoft Windows 95/98/ME, the transfer of this running image from a storage medium onto a ramdisk and the running of the protected-mode Microsoft Windows 95/98/ME on the ramdisk. What is left out as outlined above in these specifications is specified by this invention.

Microsoft's web page on "Bootable CD Drives and Windows 98" at http://www.microsoft.com/HWDEV/storage/cdboot98.htm points out that "[A]s implemented under Windows 98, booting from the product CD is much like booting from an emergency floppy disk—it is enough to allow users to see their devices, start an installation, and so on, but users cannot actually run the full operating system from CD". Without this invention, this statement is applicable to Microsoft Windows 95/98/ME as a whole. Likewise, the solution of creating a CD capable of booting the full Microsoft Windows 98 at http://www.ct.heise.de/ct/english/99/11/206/put forward by Tobias Remberg and Hajo Schulz does not provide a good solution for creating a bootable CD for running Microsoft Windows 95/98/ME. It involves the use of ramdisk for storing registry files and other temporary files. In this way, the CD cannot be removed. And as the running of the operating system relies on this non-rewriteable CD, which cannot be taken away while running, the running speed is slow. The whole system may crash or may not function properly when the operating system or application programmes require(s) direct write-access to the drive represented by the CD. A better and complete solution to the problem is to completely move the whole operating system onto ramdisk so that it no longer relies on the use of CD for system operation. This is made possible by the Contained Style of this invention, which does not require any fixed non-volatile rewriteable storage medium either. For the purpose of preserving modifications to user configuration when running the operating system on ramdisk, the Split Style of this invention by definition requires a non-volatile rewriteable storage medium for its operation.

DISCLOSURE OF INVENTION

This invention reveals a method of preparing Microsoft Windows 95/98/ME to run on ramdisk in two styles, namely the Split Style and the Contained Style.

The Split Style requires access to a non-volatile rewriteable storage medium for storing and preserving user configuration. This requirement of non-volatile rewriteable storage medium for running the operating system in ramdisk-based protected WINDOWS mode brings the advantage of automatically preserving modifications to user configuration during running the operating system.

This advantage allows for separating the core part (to be put in System Drive on ramdisk for fast running) from the less essential part (to be stored on User Drive(s) on non-volatile rewriteable storage medium for occasional access) of the operating system for computer system(s) or device(s) with limited system RAM. It also allows for setting up user applications on User Drive(s) and their continual updating and use from one session to another of running the operating system. For the purpose of preservation, user configuration used by applications and the operating system in protected WINDOWS mode is stored in a User Drive on non-volatile rewriteable storage medium. In this way, it makes possible fast system operation on ramdisk as well as user flexibility and configurability.

For the sake of clarity in description or the need of actual operation, the User Drive described above can be conceptually or materially divided into Configuration Drive, where only user configuration files together with WIN.COM are stored; Application Drive, where only user applications or system applications not necessary for starting up the operating system are stored; and Configuration & Application Drive, where Configuration and Application Drive are integrated into one drive.

As distinguished from those files stored in these User Drives (including Configuration Drive, Application Drive and Configuration & Application Drive) on non-volatile rewriteable storage medium as described above, system files which form the kernel part of the operating system are stored in a System Drive on ramdisk for fast running. In order to start up the operating system into protected WINDOWS mode, both the System Drive and the Configuration Drive as described above are required and should be made accessible and usable under real DOS mode when the command WIN or WIN.COM is issued. Application Drive is optional and can be integrated into Configuration Drive as Configuration & Application Drive or integrated with System Drive as System & Application Drive.

In the Split Style, System Drive is transferred onto ramdisk for fast running and Configuration Drive is placed on non-volatile rewriteable storage medium/media for easy preservation of user configuration. Non-kernel system application(s) or user application(s) can be placed in a separate Application Drive on ramdisk or integrated into System Drive on ramdisk in computer(s) or device(s) with sufficient RAM for fast running. Or they can be placed in a separate Application Drive or integrated with Configuration Drive to be stored on non-volatile rewriteable storage medium.

In the Contained Style, all the system files and user configuration files of the operating system are transferred onto ramdisk and the protected-mode Microsoft Windows 95/98/ME is run wholly from ramdisk without the need for accessing other storage medium. In this Style, both System Drive and Configuration Drive are copied or transferred onto ramdisk. Other types of User Drive(s) are also copied or transferred onto ramdisk as well. Furthermore, User Drive(s) including Configuration Drive, Application Drive and Configuration & Application Drive, can be integrated with System Drive in any appropriate manner. As all the data on ramdisk will disappear when the power is off, user configuration cannot be easily preserved in Contained Style. This style of running the operating system may however be very useful in cases where the user environment seldom changes and where only standard pre-installed applications and procedures are used from session to session. Non-volatile rewriteable storage medium/media can still be used for storing user data that need to be preserved.

For the operating system to be run on ramdisk, it has to be installed and configured in computer system(s) or device(s) as usual using the setup programme provided with it. There should also be a compatible ramdisk capable of holding the running image of the operating system in computer system(s) or device(s) with sufficient RAM for the protected-mode Microsoft Windows 95/98/ME to run. The ramdisk can be implemented as hardware external to the main RAM or as software within the main RAM. Real DOS mode software acting as virtual container drive driver for utilizing virtual container drive is also required so that the image of the customized Microsoft Windows 95/98/ME can be stored into virtual container drive(s) for easy copying or transfer from storage medium onto ramdisk. Furthermore, for the particular version of Microsoft Windows ME, IO.SYS and COMMAND.COM in the root directory of the hard disk boot-up drive and REGENV32.EXE in the \WINDOWS\SYSTEM directory of the installed operating system have to be patched by a software so that access to real DOS mode is enabled for loading real DOS mode driver(s) and programme(s) during the booting process. Otherwise, the IO.SYS and COMMAND.COM of the Emergency Boot Disk (prepared by Microsoft Windows ME) placed in boot-up floppy drive have to be used for enabling real DOS mode in the booting process. (This boot-up floppy Emergency Boot Disk can be etched onto a bootable CD by some CD recording software so that the bootable CD can emulate the Emergency Boot Disk.)

This invention reveals a method for customizing the configuration and preparing a running image of the operating system so that when this customized running image is booted up, it can be run off in protected WINDOWS mode on ramdisk in two different styles, namely the Contained Style and the Split Style. In the Contained Style, a System Drive containing the kernel part of the operating system and Configuration Drive containing user configuration files and WIN.COM and optionally other applications in User Drive(s) are all copied or transferred onto ramdisk for starting the operating system into protected WINDOWS mode wholly from ramdisk. Whereas in Split Style, the System Drive containing the kernel part of the operating system is copied or transferred onto ramdisk for fast running. Configuration Drive containing user configuration files and WIN.COM and optionally other applications in User Drive(s) are, for the purpose of preserving user configuration, stored on non-volatile rewriteable storage medium that can be recognized and used under real DOS mode before the operating system is started into protected WINDOWS mode. This method therefore leads to the creation of a product, i.e. a customized image of files. This image includes customized configuration files, system files of the operating system and other device drivers and programmes. The use of this image makes possible the phenomenon of running off Microsoft Windows 95/98/ME in protected WINDOWS mode on ramdisk. In Split Style, user configuration and application(s) are preserved from session to session on non-volatile rewriteable storage medium in computer system(s) or device(s) capable of running the operating system. In Contained Style, although user configuration and applications set up on ramdisk are not preserved, the operating system is free from the requirement of access to non-volatile rewriteable storage medium for its operation.

This method and the booting process (inherent in using the customized running image) include the steps of customizing the configuration of the running image of Microsoft Windows 95/98/ME; transferring or copying the properly configured running image (including system image and user configuration), other device drivers and programmes onto storage medium/media; booting off the running image in real DOS mode; loading the appropriate ramdisk; transferring or copying the system image files, other device drivers and programmes onto ramdisk with user configuration files and application(s) either also on ramdisk as in the Contained Style or on non-volatile rewriteable storage medium as in the Split Style; and finally issuing the command, WIN, under real DOS mode to start the operating system into protected WINDOWS mode.

These steps are detailed as follows:

1. Customizing the configuration of the running image of Microsoft Windows 95/98/ME Before customizing the existing configuration files, all existing configuration files, or better, all files have to be backed up first so that the existing operation system and its configuration is preserved. A new copy of these configuration files for use with a new copy of the running image of the operating system is then to be produced.

To configure a running image of Microsoft Windows 95/98/ME suitable for running off on a ramdisk involves the following sub-steps:

(a) Customizing configuration files read by the operating system under real DOS mode Microsoft Windows 95/98/ME can be made to boot up in two phases, the first phase is booting to real DOS mode. The second phase is booting to protected WINDOWS mode by issuing the WIN command. In the first phase, it reads in IO.SYS, MSDOS.SYS, COMMAND.COM, CONFIG.SYS, and AUTOEXEC.BAT, if available and applicable, for user-configurable system information, as well as commands and programmes to be executed. In the process, it prepares for loading into protected WINDOWS mode. It starts its protected-mode operation after the WIN command is issued.

(1) Customizing MSDOS.SYS

After issuing the WIN command, the operating system is loaded into protected WINDOWS mode. Before this is successful, the operating system checks the system information about where the Microsoft Windows 95/98/ME WINDOWS system files are located. This information is stored in RAM on booting and specified in MSDOS.SYS. Modifying MSDOS.SYS after booting does not change the system information stored in RAM. So for the operating system to locate these system files and run the protected-mode Microsoft Windows 95/98/ME successfully, MSDOS. SYS should contain proper settings before the operating system boots up under real DOS mode. The relevant settings for the location of the WINDOWS system files of Microsoft Windows 95/98/ME are specified under the section:

[Paths]
WinDir=
WinBootDir=
HostWinBootDrv=

WinDir= specifies where the WINDOWS system files are located. If the virtual container drive (the System Drive), which is used for holding the system image files, is mounted as V: drive after being transferred onto ramdisk, and the WINDOWS system files, excluding WIN.COM (WIN.COM has to be placed under a directory as specified by WinBootDir= setting, but WinBootDir= setting can also be identical to WinDir= setting as in the Contained Style in case where Configuration Drive is integrated with System Drive), i.e. the files of the Windows directory, are put into a directory named '\WINDOWS', then for best operation, WinDir= should be set as WinDir=V:\WINDOWS. Specifying WinDir= to another directory may work, but does not give best user operating environment.

WinBootDir= specifies where the command, WIN.COM, is stored. In this directory, besides WIN.COM, user configuration files used by the operating system (when it is started into and running in protected WINDOWS mode) are placed. These user configuration files include at least all Registry files and all INI files; Policy files and User Profile files may be included as well. Besides these files, the two file folders, Desktop and Start Menu, and all the files and sub-file folders within these two file folders of the installed Windows directory should at least be included for providing a starting user environment. If the drive containing these files, i.e. the Configuration Drive, is recognized as U: drive, and all these files and file folders are placed into a directory called \WINDOWS, the WinBootDir= should be set as WinBootDir=U:\WINDOWS.

In Split Style where Configuration Drive is to be placed on non-volatile rewriteable storage medium separate from System Drive, which is to be placed on ramdisk, WinBootDir= should be set to a directory in Configuration Drive on a non-volatile rewriteable storage medium that is accessible under real DOS mode before the operating system is started into protected WINDOWS mode. On the other hand, WinDir=, as said earlier, for best operation, should be set as the directory on the virtual container drive, the System Drive, hosted by ramdisk where all WINDOWS system files except WIN.COM are placed (however, including WIN. COM in the WinDir= directory has no adverse effect in operation).

In Contained Style, in case where Configuration Drive is made identical to the System Drive, WinBootDir= can also be made identical to WinDir= setting as V:\WINDOWS as in the example above (provided that WIN.COM and user configuration files described above are also included in this same directory). HostWinBootDrv specifies which drive that boots up the operating system. If the ramdisk is loaded as X:, the setting can be set as HostWinBootDrv=X. This setting is not absolutely required and can be set as the actual boot-up drive.

The setting:
[Options]
DisableLog= controls whether Bootlog.txt is created during the booting process. It assumes the value 1 or 0. This setting should be included and set to 1 so as to disable the creation of Bootlog.txt on booting up if the booting storage medium is a read-only medium.

The setting:
[Options]
SystemReg= controls whether the booting process scans the system registry or not. It assumes the value 1 or 0. In certain cases, the configuration of running Microsoft Windows 95/98/ME off on ramdisk may have changed the default location of the system registry, enabling this setting to 1 will lead to booting error. To ensure that the operating system boots up properly in all cases, this setting should be set to 0 so as to disable scanning system registry on booting, (2) Customizing CONFIG.SYS and AUTOEXEC.BAT It is recommended that the LastDrive setting in CONFIG.SYS under the root directory of the boot-up drive be set to Z so as to allow using all 26 drive letters, providing for the loading and mounting of ramdisk(s), virtual container drive(s) and/or other storage device(s)

As said before, on booting up to real DOS mode, the operating system prepares for running in protected WINDOWS mode. It reads in MSDOS.SYS to find out where the system files are. By default, the WinDir and WinBootDir are assumed to be C:\WINDOWS if they are not set elsewhere in MSDOS.SYS. Using such information, the operating system loads HIMEM.SYS and IFSHLP.SYS in the case of Microsoft Windows 95/98 or IFSHLP.SYS only in the case of Microsoft Windows ME. The driver(s) should be loaded in memory before WIN.COM is started so that the operating system can be run in protected WINDOWS mode.

If the driver(s), HIMEM.SYS and IFSHLP.SYS in the case of Microsoft Windows 95/98 or IFSHLP.SYS in the case of Microsoft Windows ME, is/are not found in the directory specified by WinDir= in MSDOS.SYS, the driver(s) cannot be loaded and the operating system cannot be started into protected WINDOWS mode. If the driver(s) is/are put elsewhere, the loading of which can however be made possible by specifying its/their location(s) in CONFIG.SYS with the use of the DEVICE= or DEVICEHIGH= statements. Another way of loading device driver can be done by writing a device loading programme to be executed under real DOS, either to be specified in AUTOEXEC.BAT or to be executed under DOS command prompt. Whatever is the way, the driver(s) should be loaded before the command WIN.COM is issued for protected-mode Microsoft Windows 95/98/ME to run.

Other device drivers such as ramdisk driver, CDROM driver, or virtual container drive driver (virtual container drive is defined here as a computer file or file container, when opened or mounted by programmes or utilities capable of using it, appearing to be a drive with a compatible file system capable of holding other files that are accessible under real DOS mode and protected WINDOWS mode) have to be loaded as appropriate, before WIN command is issued. This is done by specifying relevant valid entries in CONFIG.SYS, or in AUTOEXEC.BAT or by loading them under DOS command prompt as the case may be.

Virtual container drive drivers may be used in the form of compression drive drivers or encryption drive drivers or compression and encryption drive drivers provided by software developers. These drivers however should satisfy the requirements of being both mountable and accessible under real DOS mode and protected WINDOWS mode. The virtual container drive representing the System Drive has to be copied onto ramdisk. It is also possible that the ramdisk driver is integrated with the virtual container drive driver as only one driver. In this latter case, a separate step of copying or transferring the virtual container drive onto ramdisk may not be necessary or apparent as it may be integrated into the process leading to the formation of ramdisk itself. For the purpose of clarity, this separate step is assumed to be required in the following remaining description.

In Contained Style, Configuration Drive has also to be copied onto ramdisk if it is not integrated with the System Drive. In Split Style, Configuration Drive or Configuration & Application Drive however has to be remained in a non-volatile rewriteable storage medium for preserving modifications to user configuration.

Because the ramdisk so setup is not a booting device, depending on configuration, sometimes a SUBST.EXE command has to be issued before issuing the WIN command. For instance, if the ramdisk is set up as drive X:, and the boot-up device or drive is recognized as C:, then the command [drive:][path]SUBST.EXE C: X:\ can be used. Implementing [drive:][path]SUBST.EXE [host drive:][mounted drive:]\ will also improve re-usability of any running session; where [host drive:] is the drive hosting the virtual container drive and [mounted drive:] is the mounted virtual container drive. SUBST.EXE command(s) can be put in AUTOEXEC.BAT or issued at DOS command prompt before the WIN command.

Set Path= or Path=/Path statement can be included in CONFIG.SYS or AUTOEXEC.BAT respectively to facilitate locating programmes or utilities to be executed under real DOS command prompt for loading drivers, copying or transferring running image of files to ramdisk, and mounting virtual container drive.

Two additional settings in AUTOEXEC.BAT are relevant to Microsoft Windows ME. They are SET windir= and SET winbootdir=. These two settings should be made identical to the settings of WinDir= and WinBootDir= as specified in MSDOS.SYS.

(b) Customizing configuration files read by the operating system after issuing the WIN command The configuration files read by the operating system during and after the process of loading into protected WINDOWS mode are the Registry files, Policy files, User Profile files and INI files. These files contained various entries of system and user configuration information. To ensure that the operating system loads successfully into protected-mode operation, the entries containing the location, i.e. the precise drive and directory information, of the running image of the operating system should be altered accordingly. For instance, if the running image of the operating system (except WIN.COM, the entries pointing to the location of WIN.COM within configuration files have to be set to that specified by WinBootDir=) is to be found in V:\WINDOWS (i.e. the System Drive being V:) and at the moment the entries in these configuration files point to C:\WINDOWS, then all these entries have to be changed to pointing to V:\WINDOWS. This modification applies in the same way to other entries containing directory or location information of other applications or programmes so that these entries are correspondingly set to pointing to their respective valid locations.

However, as Registry files and INI files (Policy files and User Profile files are optional) are placed under the WinBootDir= directory, any entries within these configuration files referring to the location of these configuration files themselves have to be customized to pointing to the WinBootDir= directory.

In the Split Style, for example, the WinBootDir= should be different from where the system files in System Drive on ramdisk lie (for instance, at V:\WINDOWS); it must be set to pointing to a directory in Configuration Drive on a non-volatile rewriteable storage medium, such as WinBootDir=U:\WINDOWS, where configuration files and WIN.COM described above are stored. So any entries within configuration files located in the directory pointed by Win-BootDir= referring to the location of these configuration files themselves have to be set likewise to U:\WINDOWS, instead of V:\WINDOWS.

In Contained Style of the example above, if the Configuration Drive is integrated with the System Drive and the WinDir= directory identical to WinBootDir= directory, then because now WinBootDir= is identical to WinDir=, the entries pointing to the location of these configuration files within these configuration files themselves can be pointing to V:\WINDOWS. However, if the Configuration Drive to be stored on ramdisk is made different from the System Drive (also on ramdisk), then WinBootDir= assumes a value of U:\WINDOWS, and the Windows system files are located at V:\WINDOWS, the entries pointing to the location of these configuration files within these configuration files themselves have to be pointing to U:\WINDOWS, i.e. the WinBootDir=, instead of V:\WINDOWS.

Another particular entry within the Registry files has to be set to that specified by the setting of WinBootDir=. This is the following key within the Registry:

HKEY_LOCAL_MACHINE\SOFTWARE\Microsoft\Windows\
   CurrentVersion\SystemRoot

This setting directs the operating system to read and store relevant user configuration information whilst running. The operating system also reads in the information contained in file folders of Desktop and Start Menu of the WinBootDir= directory (also specified in the above key within the Registry) for starting up the user environment in relation to the Desktop configuration and Start Menu information.

The Registry files, Policy files and User Profile files cannot be easily altered under real DOS mode. For convenience, these files have to be altered after the protected WINDOWS mode is running. Because these files contain many entries about directory information, a programme has to be developed for such alteration. Suppose if the operating system now starts from C:\WINDOWS, it will crash if all entries in the Registry files pointing to C:\WINDOWS are altered to V:\WINDOWS if the process is not done properly and restored afterwards. Therefore, these configuration files have to be backed up first and used for recovery in case of crash during the alteration process later. The programme capable of doing such alteration has to, firstly change the relevant entries so that they point to their valid new location(s), secondly copy the new configuration files to another location for use later, and thirdly change back the relevant entries in the configuration files so that they point to their unaltered location(s). Otherwise, the operating system will crash.

INI files have also to be changed likewise.

The location(s) of programmes specified in Shortcut files should also be changed to their new location(s) so that they can be validly referred to and run successfully.

After the above steps of customization, the existing operating system is preserved and a new copy of MSDOS.SYS, CONFIG.SYS, AUTOEXEC.BAT, Registry files, Policy files, User Profiles, INI files and Shortcut files is produced.

Another way of obtaining suitable configuration files of a running image is to partition and format a hard disk with sufficient number of drives, and then install the operating system onto the appropriate drive, the drive letter of which will later be taken up by the virtual container drive on which the running image is to run. For instance, if drive V: is to be used as the virtual container drive, the System Drive, for running off the operating system, the hard disk should first be partitioned and formatted up to drive V:, and a new installation of the operating system is set up on this drive V:. The running image will be suitable for running from the virtual container drive when the latter is transferred onto ramdisk. Other configuration files of MSDOS.SYS, CONFIG.SYS, and AUTOEXEC.BAT should however be customized as appropriate; these files together with IO.SYS, COMMAND.COM, and HIMEM.SYS and IFSHLP.SYS in case of Microsoft Windows 95/98 or IFSHLPS.SYS in case of Microsoft Windows ME, are to be placed on the boot-up drive in appropriate locations. WIN.COM, Registry files, Policy files, User Profiles, INI files and file folders of Desktop and Start Menu and their sub-folders and files are to be placed under a directory as specified by the SystemRoot key within the Registry mentioned above and pointed to by the WinBootDir= setting on a Configuration Drive, situated on ramdisk (in the Contained Style) or created on a non-volatile rewriteable storage medium (in the Split Style) that can be recognized and used under real DOS mode before the operating system starts into protected WINDOWS mode.

Likewise, WinDir= should be set to the \WINDOWS directory (assuming where the Windows system files except WIN.COM are placed) of the virtual container drive, the System Drive, sitting on ramdisk for providing information of the location of all Windows system files except WIN.COM. The setting of WinBootDir= and the SystemRoot key within the Registry should be set as described above. Other settings within the configuration files pointing to Windows system files except those residing in User Drive(s) (including Configuration Drive, Application Drive and Configuration & Application Drive) should however be set to the valid location of these files within the System Drive, usually the \WINDOWS directory of the System Drive. Those files found in User Drives(s) should also be pointed correctly by their relevant entries within all configuration files.

After backing up the running image and the associated customized configuration files, the hard disk should be re-partitioned to have less number of drives so that a free drive letter V: can be taken up by the virtual container drive, the System Drive (to be copied or transferred to ramdisk). And there should also be free drive letters for the use of ramdisk(s) and other virtual container drive(s) if required.

In Split Style, a Configuration Drive has to be created on a non-volatile rewriteable storage medium for storing WIN.COM and user configuration files as described above. The Configuration Drive has to be available for reading and writing by the operating system when it is started up into protected WINDOWS mode.

In Contained Style, this Configuration Drive is to be copied or transferred onto ramdisk in the same way as the System Drive is. For the sake of easy copying or transfer onto ramdisk, the Configuration Drive, like the System Drive, can be in the form of virtual container drive. Or the Configuration Drive can be made identical to and integrated with the System Drive as appropriate. In this case, only one virtual container drive is copied or transferred onto ramdisk.

For some CD recording software which is able to read in a whole hard disk drive and record all its contents onto a bootable CD, which boots up as C: drive, the process of customization is further simplified by: firstly, installing the operating system as usual onto C: drive of a hard disk; secondly, creating a virtual container drive and transferring the contents of C: drive into the virtual container drive; thirdly making sure that the C: drive contains IO.SYS, COMMAND.COM, HIMEM.SYS and IFSHLP.SYS in the case of Microsoft Windows 95/98 or IFSHLP.SYS in the case of Microsoft Windows ME, ramdisk driver(s), storage device driver(s), and programmes for copying files and for utilizing these drivers, and the virtual container drive so created above and its driver; and fourthly, customizing MSDOS.SYS, CONFIG.SYS, AUTOEXEC.BAT as appropriate.

In other word, Drive C: now contains the whole customized running image—including IO.SYS, COMMAND.COM, HIMEM.SYS and IFSHLP.SYS in the case of Microsoft Windows 95/98 or IFSHLP.SYS in the case of Microsoft Windows ME, customized MSDOS.SYS, customized CONFIG.SYS, customized AUTOEXEC.BAT, ramdisk driver(s), storage device driver(s), programmes for copying files and for utilizing these drivers, and the virtual container drive, the System Drive (containing the installed image of Microsoft Windows 95/98/ME), and its driver.

In Split Style, the modifications due to the need of separating user configuration information and WIN.COM (to be placed on Configuration Drive created on a non-volatile storage medium) from all other Windows system files (to be placed within the virtual container drive, the System Drive, for transfer onto ramdisk) as described above have also to be carried out. It is preferable that another virtual container drive can be used for containing such user configuration information and created on a non-volatile rewriteable storage medium drive (other than Drive C: above) to be mounted up on real DOS booting.

In Contained Style, in the case of where the Configuration Drive and System Drive are integrated into one drive and WinDir= and WinBootDir= settings are made identical to each other, the above modifications need not be done. However, if the Configuration Drive residing on ramdisk is to be made different from the System Drive (also on ramdisk), such modifications still have to be made as appropriate. As mentioned above, the Configuration Drive is better to be in the form of virtual container drive for easy copying or transfer onto ramdisk. The Configuration Drive can be created on a non-volatile rewriteable storage medium or recorded onto the bootable CD as part of Drive C: in the form of a virtual container drive for transfer onto ramdisk under real DOS mode before the WIN command is issued.

Drive C: can then be recorded onto a bootable CD as drive C: by CD recording software.

On booting, the customized AUTOEXEC.BAT will execute commands of setting up a ramdisk, for instance as drive X:; transferring the virtual container drive, the System Drive, onto the ramdisk; mounting up the System Drive, for instance as V:; executing SUBST.EXE so that C: (the bootable CD) and X: (the ramdisk) all point to the System Drive V: (in the form of SUBST.EXE C: V:\ and SUBST.EXE X: V:\); and issuing WIN.COM.

In Contained Style, if the Configuration Drive is made different from the System Drive, the virtual container drive representing the Configuration Drive has also to be copied or transferred onto ramdisk and then mounted up before issuing WIN.COM. On booting up from the bootable CD, which now assumes Drive C:, the original drive C: on the hard disk can still be used but will be turned into another drive letter, for instance as D:. The virtual container drive (representing the Configuration Drive) so copied or transferred onto ramdisk may be mounted as U: (if the Configuration Drive is not made identical to the System Drive). After issuing the command SUBST.EXE C: V:\, the booting CD C: drive will be made referring to the contents of Drive V:, the System Drive as described above. In this way, the original booting CD is hidden. The CD drive will now be recognized as a CD drive associated with another drive letter after booting and running into protected WINDOWS mode. The CD can later be removed or replaced as usual.

In Split Style, the non-volatile rewriteable storage medium containing the virtual container drive with user configuration information (the Configuration Drive) should be available for the process of booting into protected WINDOWS mode. On booting up from the bootable CD, which now assumes Drive C:, the original drive C: on the hard disk can still be used but will be turned into another drive letter, for instance as D:. The drive containing the Configuration Drive on non-volatile rewriteable storage medium may assume Drive E:, and the Configuration Drive (in the form of virtual container drive) within it may be mounted as U:. After issuing the command SUBST.EXE C: V:\, C: drive will be made referring to the contents of Drive V:, the System Drive as described above. In this way, the original booting CD is hidden. After booting and running into protected WINDOWS mode the CD drive will be recognized as a CD drive associated with another drive letter. The CD can later be removed or replaced as usual.

The whole customized running image thus contains IO.SYS, COMMAND.COM, HIMEM.SYS and IFSHLP.SYS in the case of Microsoft Windows 95/98 or IFSHLP.SYS in the case of Microsoft Windows ME. Together with device drivers such as ramdisk driver(s), storage device driver(s), virtual container drive driver(s), and programmes or utilities for loading and utilizing these drivers and for copying files, these files are to be placed in valid locations on the boot-up drive. The image also comprises customized MSDOS.SYS, customized CONFIG.SYS and customized AUTOEXEC.BAT. These configuration files are to be read under real DOS mode on booting and should be placed on root directory of the boot-up drive. Also included are WIN.COM and other configuration files of the WinBootDir= directory in Configuration Drive. In Contained Style, Configuration Drive is to be copied or transferred onto ramdisk in the same way as the System Drive is. It can also be integrated with System Drive as System & Configuration Drive to be copied or transferred on ramdisk. In Split Style, Configuration Drive is to be created on a non-volatile storage medium for direct access. In addition, all other Windows system files supplied by the operating system during the installation process as selected by the user form the kernel part of this customized image. These files are to be placed in the virtual container drive, the System Drive, to be copied or transferred on ramdisk.

2. Transferring the Customized Running Image onto Storage Medium/Media

The customized running image may contain hundreds of files. During the process of re-booting and setting it up to run on ramdisk, the time required for copying the customized running image file by file to ramdisk under real DOS mode is very long. Furthermore, there is also a problem associated with long file name files as described previously.

Therefore, as a viable solution, it is recommended that a virtual container drive be used, as System Drive, for containing all the selected Windows system files; WIN.COM may be excluded therein.

Another virtual container drive may be used, as Configuration Drive, for containing WIN.COM and configuration files, including Registry files, INI files as well as Desktop and Start Menu file folders and their sub-folders and files, and optionally Policy files and User Profile files. These files have to be copied to a directory as specified by the System-Root key in the Registry and by the WinBootDir= setting.

In Contained Style, if Configuration Drive is integrated with System Drive as System & Configuration Drive, only one virtual container is required. Otherwise, Configuration Drive and System Drive have to be created separately.

In Split Style, for the purpose of preserving user configuration, Configuration Drive has to be created on non-volatile rewriteable storage medium. An ordinary hard disk drive may be used for Configuration Drive instead of a virtual container drive.

Furthermore, IO.SYS, COMMAND.COM, HIMEM.SYS and IFSHLP.SYS in the case of Microsoft Windows 95/98 or IFSHLP.SYS in the case of Microsoft Windows ME, customized MSDOS.SYS, customized CONFIG.SYS and customized AUTOEXEC.BAT, device drivers such as ramdisk driver(s), storage device driver(s), virtual container drive driver(s), and programmes or utilities for loading and utilizing these drivers and for copying files have also to be copied into the root directory and other valid locations on a boot-up drive for use upon booting.

For copying purpose, one can start up the operating system in protected WINDOWS mode and make use of EXPLORER.EXE. If EXPLORER.EXE is used, the WIN386.SWP system swap file cannot be copied. This file therefore has to be deselected for copying purpose. It will be created afresh on next running of the customized running image.

For creating virtual container drive, the compression drive software, Stacker 4.1 (copyrighted by Stac Electronics in 1995), is found to be a workable one to use. By using virtual container drive, for instance Stacker 4.1 compression drive, there is only one file to copy to storage medium instead of hundreds of files associated with the Windows system image. This speeds up the process of copying or transferring the Windows system image to any storage medium. Because the Stacker 4.1 compression drive can be a file with short file name, it can be copied under real DOS mode onto ramdisk, for instance using XCOPY32.EXE. The use of compression drive also saves space when it is copied to storage medium or later to ramdisk as well.

In this connection, other compatible virtual container drive drivers can also be used instead.

The step of copying or transferring Windows system files into virtual container drive acting as System Drive can be done away with if the operating system is installed into the virtual container drive concerned. However appropriate modifications to configuration files may be required. In Split Style, customized configuration files and WIN.COM have to be copied or transferred onto Configuration Drive on non-volatile rewriteable storage medium. In Contained Style, customized configuration files and WIN.COM likewise have to be copied or transferred onto a virtual container drive acting as Configuration Drive if the Configuration Drive is to be separated from the System Drive.

Once virtual container drive(s) containing the Windows system image is/are prepared, it/they can be put onto any storage medium for use later. This is the same for the boot-up drive created as described above. The storage medium can be of any type. For it to be suitable for any use, the running speed of the storage medium should be acceptable to users. ROM, EEPROM, CDROM, DVDRAM, DVDROM, PCMCIA disks, removable MO disks, or other kinds of fixed or removable SCSI, ATAPI or USB hard disks, etc. can all be used. The transfer of virtual container drive(s) and the boot-up drive onto storage medium can be carried out by utilities most optimized for the particular storage device(s) used. The storage medium containing the boot-up drive has to be bootable when accessed by the booting device.

On booting up, the booting device has to be able to make use of the contents of the boot-up drive as described earlier and start up the process of booting up Microsoft Windows 95/98/ME into real DOS mode, setting up ramdisk(s), copying or transferring the virtual container drive representing the System Drive from the storage medium onto ramdisk. In the case of Contained Style, Configuration Drive and any other User Drive(s) have also to be copied or transferred onto ramdisk if they are not integrated with the System Drive. In the case of Split Style, Configuration Drive created on non-volatile rewriteable storage medium should be accessible for use. The booting process then goes on to mount up the virtual container drive(s) contained in the storage medium so prepared as described above, and finally starts off the operating system on the ramdisk into protected WINDOWS mode.

3. Booting Off the Customized Running Image in Real DOS Mode

To boot off the customized running image in real DOS mode and to access it later, the booting device has to gain access to the storage medium/media. On the storage medium/media are stored the boot-up drive, the System Drive and the Configuration Drive as described above. The image of the following files, namely, IO.SYS, MSDOS.SYS, CONFIG.SYS, COMMAND.COM, and AUTOEXEC.BAT, should be stored in the root directory of the boot-up drive or the contents of such files can be read for the purpose of booting. MSDOS.SYS, CONFIG.SYS, and AUTOEXEC.BAT have to be configured or customized as described above.

HIMEM.SYS and IFSHLP.SYS in the case of Microsoft Windows 95/98 or IFSHLP.SYS in the case of Microsoft Windows ME, ramdisk driver, storage device driver and virtual container drive driver are also required to be available for loading before issuing the WIN command.

4. Loading Appropriate Ramdisk

Either hardware or software ramdisk driver can be used. Ramdisk driver can either be loaded as specified in CONFIG.SYS or in AUTOEXEC.BAT or under DOS command prompt.

5. Transferring Windows System Image onto Ramdisk and Issuing WIN Command

After booting off into real DOS mode, the Windows system image has to be copied onto the ramdisk. XCOPY32.EXE or other file-copying utilities of good copying speed should be available on the boot-up drive and used for this purpose under real DOS mode.

As described previously, it is preferable to use a virtual container drive, such as compression drive, as the System Drive, to hold the Windows system files for fast copying onto ramdisk, as a solution for the problem arising from long file name files and as a means for saving space on ramdisk. If a virtual container drive is used, it has to be mounted after being copied or transferred onto the ramdisk. In this way, the Windows system image contained within it can be accessed under real DOS mode. On issuing the WIN command, the whole protected-mode Microsoft Windows 95/98/ME can be run off on the ramdisk.

For some configuration, the SUBST.EXE command has to be issued before issuing the WIN command, also as described previously.

In Contained Style, the Configuration Drive can be made integrated with the System Drive. If not, the Configuration Drive has also to be copied or transferred onto ramdisk and made accessible before issuing the WIN command.

In Split Style, the Configuration Drive (on non-volatile rewriteable storage medium) containing user configuration files and WIN.COM has to be accessible upon real DOS mode booting. Issuing WIN command will execute the WIN.COM stored in the Configuration Drive.

In both Contained Style and Split Style, issuing the WIN command starts the process of booting into protected WINDOWS mode and in the process, user configuration information stored in Configuration Drive and the Windows system image stored in System Drive are read in and used.

BEST MODE FOR CARRYING OUT THE INVENTION

Because of the complexity of the process of customizing the configuration of the running image of the operating system, the best mode for carrying out the invention involves the use of a computer with CPU of good running speed, large amount of RAM, for instance 512 megabytes or more (however, 256 megabytes are found to be sufficient to run a bare operating system without other application programmes installed with it), a fast removable and bootable hard disk or MO disk, and preferably a high speed and bootable CD-RW drive; other peripherals are optional.

Microsoft Windows 95/98/ME is to be freshly installed onto the removable hard disk or MO disk at a drive letter, which will be assumed by the virtual container drive (the System Drive) after being put onto ramdisk and mounted up. In this way, the customization required for MSDOS.SYS, CONFIG.SYS, AUTOEXEC.BAT will be minimal.

In MSDOS.SYS, the WinBootDir= setting has to be changed to pointing to the directory of the Configuration Drive where user configuration information and WIN.COM for starting the operating system in protected WINDOWS mode are stored. In case of Contained Style where Configuration Drive is integrated with System Drive and WinDir= is set identical to WinBootDir=, the System Drive can be taken as the Configuration Drive also.

WIN.COM and user configuration information(including Registry files, INI files as well as Desktop and Start Menu file folders and their sub-folders and files and optionally Policy files and User Profile files) have to be copied to a directory of a Configuration Drive specified by WinBootDir=. The SystemRoot key within the Registry has to be set to the WinBootDir= directory as well.

Any entries contained in configuration files indicating the location of the Registry files, Policy files, User Profile files, INI files and Shortcut files have also to be customized to pointing to their valid location.

The Windows system image has also to be transferred to a virtual container drive, representing the System Drive, such as Stacker 4.1 compression drive.

Other files, including IO.SYS, customized MSDOS.SYS, COMMAND.COM, customized CONFIG.SYS, customized AUTOEXEC.BAT, HIMEM.SYS and IFSHLP.SYS in the case of Microsoft Windows 95/98 or IFSHLP.SYS in the case of Microsoft Windows ME, other device drivers, such as CDROM driver, ramdisk driver, virtual container drive driver and programmes or utilities for loading and utilizing these drivers and for copying or transferring files should be added to the host boot drive. This host boot drive also contains the virtual container drive representing the System Drive, such as Stacker 4.1 compression drive (which may also contain the above files together with Windows system files). This collection of files forms the bootable system image of the operating system, excluding WIN.COM and user configuration files, which are to be placed on Configuration Drive.

As said earlier, in case of Contained Style where Configuration Drive is integrated with System Drive and WinDir= is set identical to WinBootDir=, the System Drive can be taken as the Configuration Drive. Otherwise, a separate Configuration Drive represented by a virtual container drive has to be created. And this Configuration Drive will have to be copied or transferred to ramdisk in the same way as the System Drive will.

This bootable system image can then be copied or recorded onto a bootable CD by using the utilities provided with the CD-RW drive.

In Contained Style, the Configuration Drive may be added, as appropriate, onto the CD or stored on other storage medium (such as the removeable hard disk or MO). This Configuration Drive should be accessible under real DOS mode for copying or transfer onto ramdisk and mounted up if it is in the form of virtual container drive before starting the operating system into protected WINDOWS mode.

In Split Style, the removable hard disk or MO disk may be used for hosting another virtual container drive (representing the Configuration Drive containing WIN.COM and user configuration information) to be mounted up under real DOS booting for starting the operating system into protected WINDOWS mode.

The CD-RW is configured to be the booting device for booting up the CD so produced. The operating system will boot into real DOS mode from the CD. Ramdisk is then set up. The virtual container drive, i.e. the System Drive, containing Windows system image is copied onto the ramdisk, mounted up and made accessible. In Contained Style, the virtual container drive representing the Configuration Drive, whether found on the bootable CD or on the removable hard disk or MO disk, has to be copied or transferred onto ramdisk and mounted up. And also in Contained Style where Configuration Drive is integrated with System Drive and WinDir= is set identical to WinBootDir=, the System Drive can be taken as the Configuration Drive. In Split Style, the virtual container drive (the Configuration Drive) containing WIN.COM and user configuration files sitting on the removable hard disk or MO disk has also to be mounted up and made accessible. SUBST.EXE may be issued as appropriate. And finally the protected-mode Microsoft Windows 95/98/ME runs off on the ramdisk as configured.

In Split Style, as the removable hard disk or MO disk hosts the Configuration Drive, it cannot be removed. In Contained Style, it however can be removed as well. The bootable CD-RW drive can be seen as a drive associated with a drive letter other than C: and the booting CD can be removed or replaced as usual. The ramdisk is simply regarded as another rewriteable fixed disk by the operating system except that the operating system is now running on a storage medium of ram speed.

INDUSTRIAL APPLICABILITY

The requirement of a fixed non-volatile storage medium for hosting the whole image of Microsoft Windows 95/98/ME means the running speed of the operating system depends, amongst other limiting factors of course, very much on the speed of the fixed non-volatile storage medium used.

The use of a fixed non-volatile rewriteable storage medium for storing the Windows system image of the operating system makes it susceptible to virus infection. The maintenance of a clean Windows system image suitable for running whenever it is needed without the need for re-installation becomes a daily challenge.

The running of the operating system on a ramdisk makes computer system run faster, saving computing time. In case of running the ramdisk-based operating system in Contained Style, the freedom of choice of access to fixed non-volatile storage medium means that standalone desktop computers, notebook computers or hand-held computers capable of running the operating system can be built and used with or without a hard disk. Notebook or hand-held computers running without a fixed hard disk can save much battery power and have a longer running time. They can rely on other removable storage systems such as PCMCIA storage media, MO disks, Zip disks or LS-120 disks or even free drive space on the Internet. This mode of functioning helps computing on transit.

Computer systems booting off from a running image of the operating system stored on CDROM or ROM and running the operating system on ramdisk in protected WINDOWS mode can guarantee that each such booting and running is clean and unaffected by virus infection. This can save the maintenance cost of the computing world adopting the operating system in relation to efforts spent on anti-virus measures and in relation to the need for system backup and recovery.

By using this invention, computer makers can mass produce computers of uniform configurations and provide the consumers simply with a bootable CD that can, so to speak, boot off the full Microsoft Windows 95/98/ME from the CD. The standard user configuration information can be stored also on the CD in the form of a virtual container drive (the Configuration Drive) to be copied onto another ramdisk or hard disk for booting into protected WINDOWS mode. If this standard Configuration Drive is to be used, it can be copied onto ramdisk in case of running the operating system in Contained Style or copied onto hard disk in case of running the operating system in Split Style. This copying of the standard Configuration Drive from booting CD onto ramdisk or hard disk is optional as user(s) may choose to load up or utilize previously customized Configuration Drive stored on hard disk or other storage medium as well.

For preservation of user configuration by running the ramdisk-based operating system in Split Style, the virtual container drive representing the Configuration Drive on the CD can be copied onto the hard disk. If there is already a Configuration Drive with valid user configuration on the hard disk, the user can choose not to do the copying during the real DOS booting. The Configuration Drive can preserve modifications to user configuration in relation to user application(s) or system applications set up on hard disk from one session of running the operating system to another. If a virtual container drive is used for Configuration Drive, the Configuration Drive can be mounted up on booting for use, be backed up easily and restored if so desired. Anyway, the standard Configuration Drive found on the booting CD can be used as the ultimate resort in case the one on hard disk is damaged and as the initial starting point for customization. Such customization can be different for different users. If the hard disk or MO disk is a removable device, different users having their own Configuration Drives may start the computer in their own customized way. Such computer is also safe and prevents unauthorized access in the sense that the computer cannot boot without suitable Configuration Drive put into the system.

In Split Style, the possibility of preserving user configuration from session to session of running the operating system provides the opportunities of setting up system and user application(s) onto the Configuration Drive or other User Drive(s) and still running the operating system on ramdisk. For computer system(s) or device(s) with less system memory, less essential system files can be set up on Configuration Drive or other User Drive(s) for occasional access and the kernel part of the operating system (stored in System Drive) be transferred onto ramdisk for fast system running.

Given sufficient RAM, the customized Configuration Drive or User Drive(s) on hard disk so set up in Split Style can also be utilized in Contained Style. Because it is also possible to configure the booting process to accommodate the possibility of giving the user(s) a choice of loading such customized Configuration Drive and User Drive(s) from hard disk or other storage medium onto ramdisk during the boot-up process under real DOS mode. This loading of the customized Configuration Drive or User Drive(s) onto ramdisk has however to be accompanied by appropriate use of SUBST.EXE command(s) to accommodate for the difference in configuration between Contained Style and Split Style for such purpose. The operating system can then be started into protected WINDOWS mode.

The booting CD is not required after the operating system starts running from ramdisk in protected WINDOWS mode, thus providing flexibility. The CD is virus-free and guaranteed to boot off a clean full Microsoft Windows 95/98/ME every time. The invention also accommodates other configurations not using CD as the bootable device, such as PCMCIA disks, ROM, EEPROM, or removable MO disks, etc.

The prior art for the implementation of this invention includes the operating system of Microsoft Windows 95/98/ME; the hardware of any device(s), including computer system(s), capable of running Microsoft Windows 95/98/ME; the specifications of booting these device(s), including computer system(s), under real DOS mode; in the case of Microsoft Windows ME, the software for enabling access to real DOS mode (by patching IO.SYS, COMMAND.COM and REGENV32.EXE) during the booting process if the IO.SYS and COMMAND.COM of Emergency Boot Disk prepared by Microsoft Windows ME are not used; various kinds of ramdisk device drivers, storage device drivers, virtual container drive drivers; programmes or utilities for loading and utilizing these device drivers; and programmes or utilities for copying or transferring files from and to storage medium/media for use with Microsoft Windows 95/98/ME.

In combination with the use of the technical features contained in the prior art stated above, this invention makes possible the phenomenon of running off Microsoft Windows 95/98/ME in protected WINDOWS mode on ramdisk (with user configuration preserved and optionally system and user application(s) set up on User Drive(s) when running the ramdisk-based operating system in Split Style) and, in this relation, is characterized by the following claims:

What is claimed is:

1. A method, implemented in computer-executable program(s) or computer-executable instruction(s), of running Microsoft Windows in Protected-Mode on ramdisk in computer system(s) or device(s), comprising steps of:

(1) preparing, producing and storing a copy of a customized running image of Windows system files and user configuration files in at least one virtual container drive contained in computer file(s) or file container(s) stored on storage medium/media, which includes the steps of transferring:
  (a) the customized copy of user configuration files read under Real-Mode, including MSDOS.SYS, CONFIG.SYS and AUTOEXE.BAT,
  (b) the customized copy of user configuration files for running up Microsoft Windows into Protected-Mode on ramdisk, including Windows Registry files, Policy files, User Profile files, INI files and ShortCut files, and
  (c) ramdisk driver(s), storage device driver(s), and virtual container drive driver(s); and
(2) booting Microsoft Windows from said copy of the running image from storage medium/media, with the use of the customized user configuration files, by reading, loading or executing the files transferred in substeps (a), (b) and (c) of Step (1) as well as HIMEM.SYS, IFSHLP.SYS and Real-Mode system files, IO.SYS, COMMAND.COM and WIN.COM, so that Microsoft Windows 95/98/ME runs in Protected-Mode Windows on ramdisk in both the Contained Style and the Split Style.

2. The method of claim 1, wherein said customized user configuration files comprise a customized copy of Real-Mode user configuration file MSDOS.SYS, containing at least one of the following customized entries for running ramdisk-based Protected-Mode Windows:
  (a) a customized entry, WinDir, pointing to the location of Windows system files on ramdisk, and
  (b) a customized entry, WinBootDir, pointing to the booting directory of the customized running image of Windows system files on ramdisk.

3. The method of claim 1, wherein said customized user configuration files comprise a customized copy of Real-Mode user configuration file CONFIG.SYS, containing at least one of the following customized entries for running ramdisk-based Protected-Mode Windows:
  (a) a customized entry, Device or DeviceHigh, to accommodate the inclusion and loading of a ramdisk device driver,
  (b) a customized entry, Device or DeviceHigh, to accommodate the inclusion and loading of a storage device driver, and
  (c) a customized entry, Device or DeviceHigh, to accommodate the inclusion and loading of a virtual container drive driver.

4. The method of claim 1, wherein said customized user configuration files comprise a customized copy of Real-Mode user configuration file AUTOEXEC.BAT, containing at least one of the following customized entries for running ramdisk-based Protected-Mode Windows:
  (a) a customized entry for executing a program for loading and utilizing a ramdisk device driver,
  (b) a customized entry for executing a program for loading and utilizing a storage device driver,
  (c) a customized entry for executing a program for loading and utilizing a virtual container drive driver,
  (d) a customized entry, SET windir, pointing to the directory of the WinDir setting in MSDOS.SYS,
  (e) a customized entry, SET winbootdir, pointing to the directory of the WinBootDir setting in MSDOS.SYS,
  (f) a customized entry for reading, loading or executing SUBST.EXE, and
  (g) a customized entry for reading, loading or executing WIN.COM.

5. The method of claim 1, wherein said customized user configuration files comprise a customized copy of Windows Registry files, wherein any entries relating to the locations of files used by Protected-Mode Windows are customized to point to their valid locations, and wherein the key of HKEY_LOCAL_MACHINE\SOFTWARE\Microsoft\Windows\CurrentVersion\SystemRoot is set to the directory as specified by WinBootDir setting in MSDOS.SYS; and in particular entries relating to the locations of files sitting on ramdisk are customized to point to their valid locations on ramdisk.

6. The method of claim 1, wherein said customized user configuration files comprise a customized copy of Windows INI files, wherein any entries relating to the locations of files used by Protected-Mode Windows are customized to point to their valid locations; and in particular entries relating to the locations of files sitting on ramdisk are customized to point to their valid locations on ramdisk.

7. The method of claim 1, wherein said customized user configuration files comprise a customized copy of Windows Policy files, wherein any entries relating to the locations of files used by Protected-Mode Windows are customized to point to their valid locations; and in particular entries relating to the locations of files sitting on ramdisk are customized to point to their valid locations on ramdisk.

8. The method of claim 1, wherein said customized user configuration files of comprise a customized copy of Windows User Profile files, wherein any entries relating to the locations of files used by Protected-Mode Windows are customized to point to their valid locations; and in particular entries relating to the locations of files sitting on ramdisk are customized to point to their valid locations on ramdisk.

9. The method of claim 1, wherein said customized user configuration files of comprise a customized copy of Windows ShortCut files, wherein any entries relating to the locations of files used by Protected-Mode Windows are customized to point to their valid locations; and in particular entries relating to the locations of files sitting on ramdisk are customized to point to their valid locations on ramdisk.

10. The method of claim 1, wherein said step of preparing, producing and storing a copy of a customized running image of Windows system files and user configuration files in at least one virtual container drive contained in computer file(s) or file container(s) stored on storage medium/media comprises at least one of the following further steps of transferring:
  (d) files selected from files provided by Microsoft for setting up a running image of Protected-Mode Windows or from files of a running image of Protected-Mode Windows,
  (e) the file folders, Desktop and Start Menu, and all the files and sub-file folders within these two file folders of the installed Windows directory, and
  (f) programs for reading, writing and utilizing ramdisk(s), storage medium/media and virtual container drive(s) and programs for copying or transferring files to valid locations of virtual container drive(s) as contained in computer file(s) or file container(s) that have been created on or subsequently transferred to storage medium/media.

11. The method of claim 1, wherein said step of booting Microsoft Windows from the copy of a customized running image from storage medium/media, with the use of the customized user configuration files, to run Microsoft Windows into Protected-Mode Windows on ramdisk, executes at least one of the following further steps:
- (a) reading, loading or executing Real-Mode user configuration file, MSDOS.SYS,
- (b) reading, loading or executing Real-Mode user configuration file, CONFIG.SYS,
- (c) reading, loading or executing Real-Mode user configuration file, AUTOEXEC.BAT,
- (d) reading, loading or executing ramdisk device driver(s),
- (e) reading, loading or executing virtual container drive driver(s),
- (f) reading, loading or executing storage device driver(s),
- (g) transferring virtual container drive(s) from storage medium to ramdisk,
- (h) mounting or making available for use the virtual container drive(s) so transferred to ramdisk, and
- (m) reading, loading or executing Real-Mode system file, SUBST.EXE, so that Protected-Mode Windows is started to run on ramdisk.

12. The customized running image of Windows system files and user configuration files so produced and transferred to computer-readable storage medium/media as specified in claim 1.

13. The use of the customized running image of Windows system files and user configuration files so produced and transferred to storage medium/media as specified in claim 1 in computer system(s) or device(s).

* * * * *